United States Patent [19]

Sasaki et al.

[11] 3,937,928

[45] Feb. 10, 1976

[54] EMBOSSED CARD READER

[75] Inventors: Takehiko Sasaki, Yamatokoriyama; Keizo Yamamoto, Nara; Hiroaki Fukuda, Tenri, all of Japan

[73] Assignee: Sharp Kabushiki Kaisha, Osaka, Japan

[22] Filed: Apr. 15, 1974

[21] Appl. No.: 460,900

[52] U.S. Cl. .... 235/61.11 E; 250/566; 340/146.3 F; 340/146.3 G
[51] Int. Cl.² ... G06K 7/10; G08C 9/06; G06K 9/00
[58] Field of Search ................ 235/61.11 E, 61.7 B; 340/146.3 F, 146.3 G, 149 A; 250/555, 566, 567

[56] References Cited
UNITED STATES PATENTS

| | | | |
|---|---|---|---|
| 3,611,292 | 10/1971 | Brown et al. | 235/61.11 E |
| 3,612,832 | 10/1971 | Goldstein et al. | 235/61.11 E |
| 3,627,991 | 12/1971 | Beall et al. | 235/61.11 E |
| 3,774,015 | 11/1973 | Lockard | 235/61.11 E |
| 3,786,238 | 1/1974 | Heisner | 235/61.11 E |

*Primary Examiner*—Daryl W. Cook
*Attorney, Agent, or Firm*—Stewart and Kolasch, Ltd.

[57] ABSTRACT

An information reader for optically reading information recorded in the form of an array of aligned embossments on a card, comprising a slit plate positioned over a card transport table having two slits, one for directing incident light toward the embossed card and the other for leading to a light-sensitive element series light which has passed past the first named slit and then reflected from a planar surface or raised surface of the embossed card. While the information containing card causes reciprocating motion on the card transport table at a fixed rate, light passed past the last named slit is detected in a storage mode by sequentially scanning the multiple light-sensitive elements so that pattern recognition for the recorded information is carried out by measuring the detection light.

12 Claims, 13 Drawing Figures

3,937,928

EMBOSSED CARD READER

BACKGROUND AND SUMMARY OF THE INVENTION

The present invention relates to an information reading apparatus for reading information registered on record mediums such as cards, tapes and the like. More particularly, the present invention is directed to means for reading characters each having a specific configuration defined by a serial array of embossments on a card formed of any suitable material such as for example, plastic.

With the present day development of credit card systems for cashless transactions, effort is being expended by industry to develop new and improved systems wherein individual cards may be operatively connected in an on-line basis to a central computer system and more specifically loaded into a certain teller terminal unit in order to provide data necessary for the central computer to manipulate these transactions. To implement such systems, the concurrent development of excellent credit cards having a high degree of reliability and long life and an improved reader which automatically reads information registered on a card and converts it to any appropriate form accessible directly to computers are required.

One improved type of the credit card is an embossed card wherein the desired number of characters are marked in an array of embossments on a plastic sheet. In the past, one way of optically reading each individual character on the embossed card is to establish a basic plate having a single slit over the surface of the embossed card.

Light beams passing through the slit at a predetermined angle irradiates and scans optically the surface of the card. Reflection light beams passing through the same slit are sensed by a series of light-sensitive elements to determine from variations in the amount of the reflected light beams whether the character embossments are in part present or not. However, since irradiation for the card surface and detection of the reflection light beams are both by the same slit, there are in practice problems associated with the signal-to-noise ratio.

Accordingly, it is an object of the present invention to provide an embossed card reader which can overcome the aforementioned shortcomings of the prior art techniques.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, the above-mentioned disadvantages may be eliminated and an improved information reader can be provided wherein a slit plate with a double slit construction is utilized in order to enhance the accuracy of the reading of the characters. The information area of the embossed card is irradiated and scanned by light beams passed past one of the pair of slits. Only light beams reflected on the planar or raised surface of the card are allowed to extend over the remaining slit to an array of parallel aligned light-sensitive elements. By sequentially scanning operations of the light-sensitive elements, each individual embossment is detected in a storage mode to recognize characters registered on the card.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figures 1A, 1B:
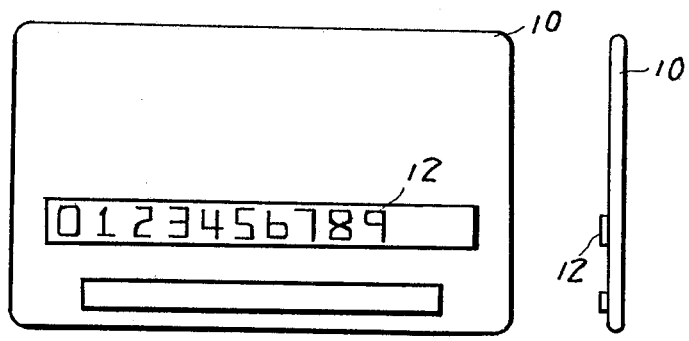
FIGS. 1A and 1B are a plane view and a side view, respectively, of an embossed card used with an information reader of the present invention.

Referring now to FIGS. 1A and 1B, there is illustrated a record medium, for example, an embossed credit card 10 of any appropriate material such as plastic which includes characters 12 defined by an array of serially aligned embossments. The individual characters or numerals marked on the credit card 10 has a specific unique configuration, for example, in the form of FARRINGTON 7B FONT, normally used in the art. It may be covered with desired colors by painting the same with magnetic ink and the like.

Figures 2A, 2B:
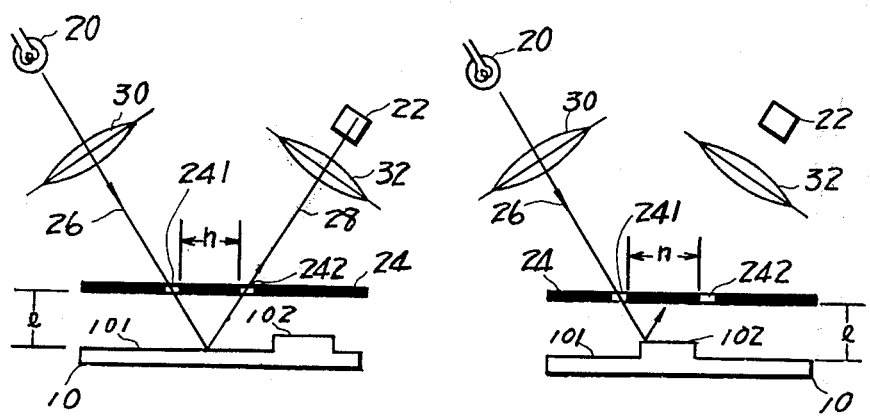
FIGS. 2A and 2B are sectional views of an optically reading arrangement for the explanation of the operational principles of the readers embodying the present invention.

FIGS. 2A and 2B show operational principles of optically reading the character area of the embossed card 10 in accordance with the present invention. A source of light 20 such as tungsten lamp, a series of light-sensitive elements 22 and a slit plate 24 having two slits 241, 242 together form the optical system. The credit card 10 is positioned below the slit plate 24 and the reading of characters is achieved by the differentiation between the planar surface 101 and raised surface 102 of the credit card 10. Illustrated is only an example wherein detection light 28 appears when incident light 26 impinges on the planar surface 101. Light from the light source 20 is converted through a lens 30 into the form of light beam which in turn impinges on the planar surface 101 or the raised surface 102 of the card 10 after passing past the first slit 241 for incident light.

As illustrated in FIG. 2A, light which strikes on the planar surface 101 reflects thereon and passes through the second slit 242 as reflected light. Another lens 32 has the effects of collecting the reflection light on a certain light-sensitive element 22. The reflection light is thus converted into electric signals. On the other hand, as illustrated in FIG. 2B, light which strikes the raised surface 102 does not arrive at the slit 242 for reflected light and thus does not result in the occurrence of electric signals.

Therefore, the distance $l$ between the card 10 and the slit plate 24 and the distance $h$ between the incident light slit 241 and the reflection light slit 242 should be chosen such that the reflection light 28 from the planar surface 101 is permitted to reach the light-sensitive element 22 and the counterpart from the raised surface 102 is interrupted and accordingly is not permitted to reach the light-sensitive element. This system provides simple and accurate character reading functions.

Figures 3, 4:
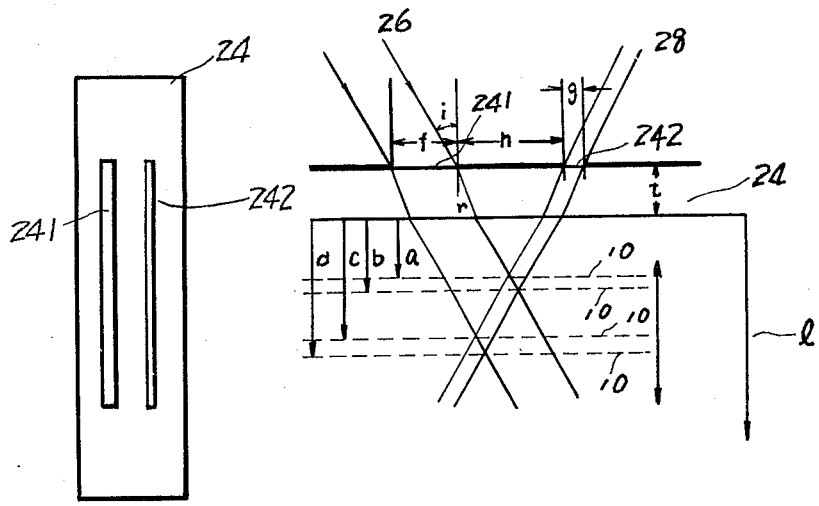
FIG. 3 is a plane view of a slit plate used in the arrangement of FIGS. 2A and 2B.
FIG. 4 is a sectional view showing the relation between the slit plate and the embossed card.

FIG. 3 is a plane view of the slit plate. As discussed above, the slip plate 24 is provided with a slit 241 for the incident light and a slit 242 for the reflection light.

Figure 5:
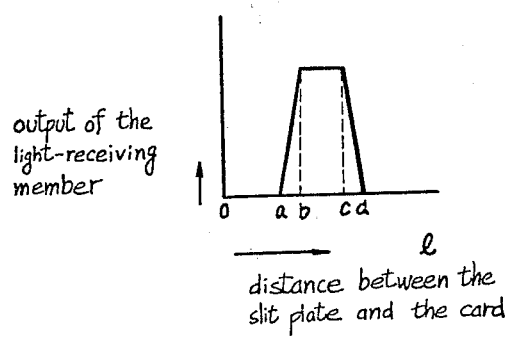
FIG. 5 is a graph showing variations in light intensity versus the positions of the slit plate.

FIG. 4 shows the relation between the distance between the slit plate and the embossed card and the distance between the two slits. If the distance $l$ between the embossed card 10 and the slit plate 24 varies, the result will be variations in the outputs from the light-sensitive element 22 based upon the reflection light 28 from the planar surface 101 of the embossed card 10 as shown in FIG. 5. Symbols, $a, b, c, d$ used in FIG. 5 correspond to $a, b, c, d$ in FIG. 4, respectively.

It will be clear from FIG. 5 that for the purpose of making a distinction between the planar surface 101 and the raised surface 102 of the card 10 the latter must be positioned between the points O while the former must be positioned between the points $b$ and $c$ thereby ensuring the detection of only the planar surface. As an alternative, the raised surface 102 can be positioned between the points $b$ and $c$ while the planar surface 101 is positioned above the point $d$ thereby detecting only the raised surface.

The distance $a$ between the slit plate and the card when the electric signals appear due to the reflection light from the card 10 is given as follows:

$$a = \left(\frac{h}{2} - t \cdot \tan R\right) / \tan i$$

Wherein $h$ is the distance between the two slits;
$t$ is the thickness of the slit plate;
$i$ is the angle of incidence of light to the slit; and
$r$ is the angle of light refraction.

Figure 6:
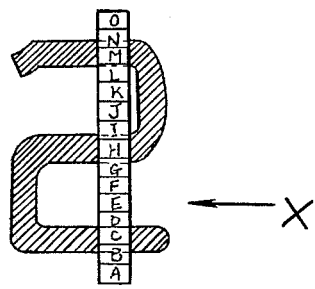
FIG. 6 is a plane view of an array of light-sensitive elements relative to embossments on a card.

FIG. 6 is a plane view of an alignment of a detector element series. Typically, the detector elements may be, for example, fifteen light-sensitive elements 22 such as photo-transistors A, B, C - - - O which are positioned relative to the character area as shown in this drawing. During the time period wherein the card 10 is transported at a fixed rate in the direction X shown by the arrow, that is, to the left, the photo-transistors are sequentially scanned in the ascending order for recognizing all of the individual characters.

Figure 7:
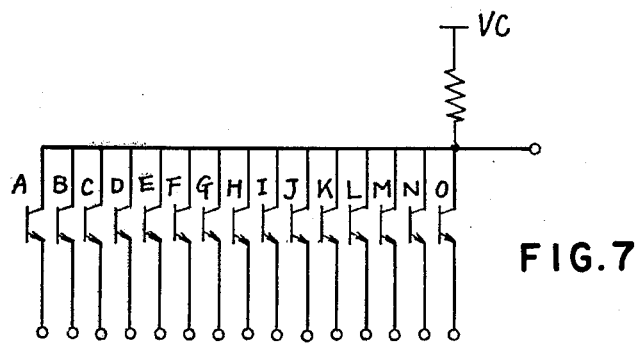
FIG. 7 is a wiring diagram of the light-sensitive element array.
Figure 8:
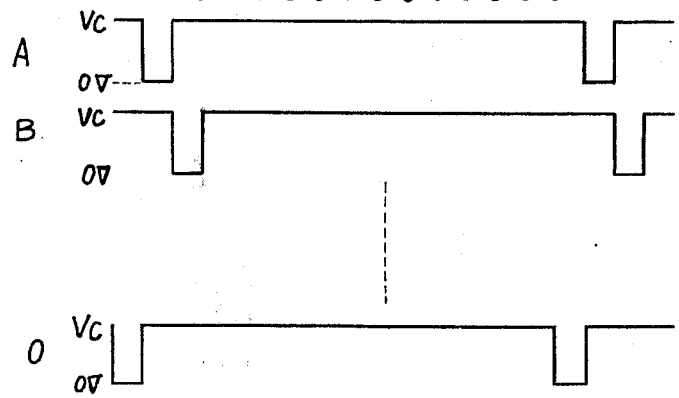
FIG. 8 is a time chart of scanning pulses.

Turning now to FIG. 7 showing a wiring diagram of the photo-transistors and FIG. 8 showing a time chart of scanning pulses, a plurality of the photo-transistors A, B, C - - - O are connected together in parallel and function in a charge mode for the purpose of signal detection. FIG. 8A depicts the waveform of voltage signals applied to the photo-transistor A which is sampled when the voltage is OV. The charge is accumulated on the photo-transistor A during the period when the voltage is $+V_cV$. The applied pulses A, B, C - - - O are different in phase and thus two photo-transistors are never sampled simultaneously.

Figure 9:
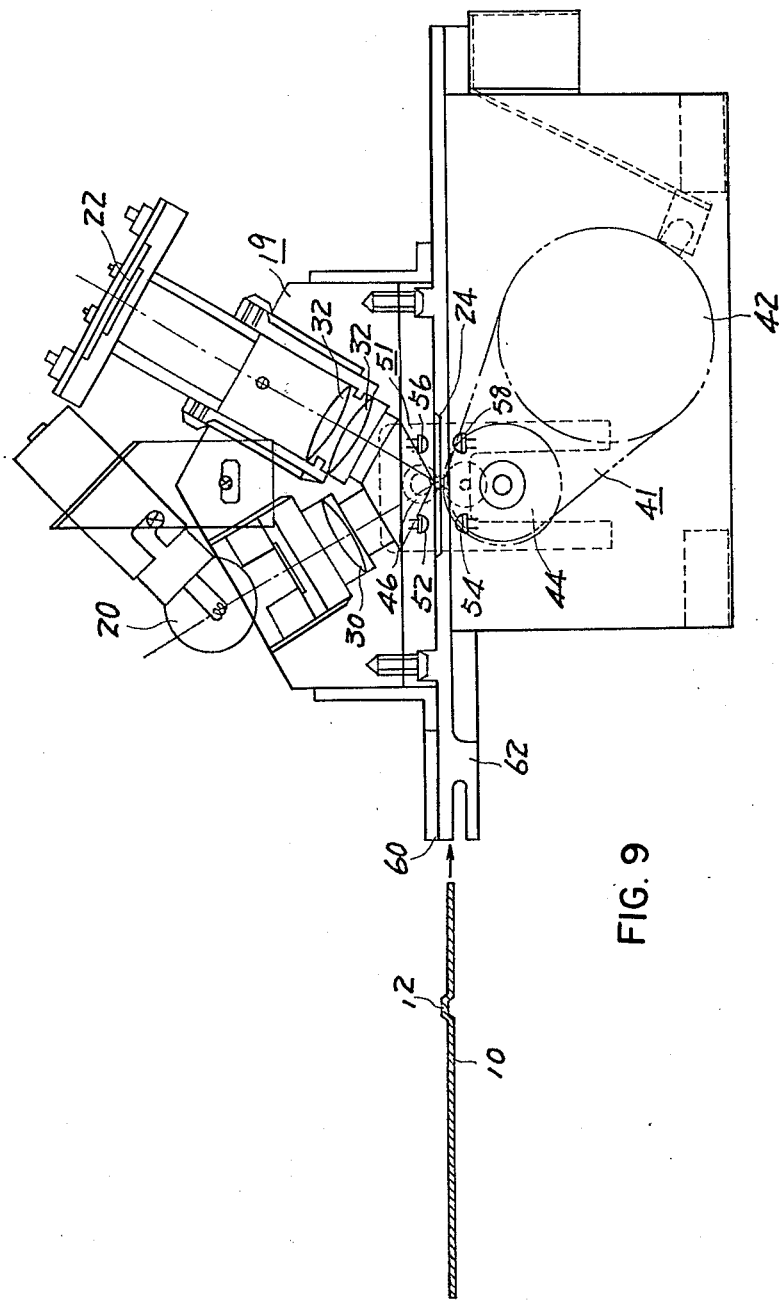
FIG. 9 is a sectional view showing a construction of an embodiment of the present invention.

The following discussion relates to an embodiment of the present invention illustrated in FIG. 9. The reading head 19 includes a light source 20, light-sensitive elements 22, a slit plate 24, lenses 30, 32, and the like, as discussed above. This arrangement further includes card transport means 41 and card position detector means 51. The card 10 is introduced into the reader apparatus through a card port 60 and at this time the card 10 provides optical shutters for a first pair of light-emitting elements and light-receiving elements 52–54 within the card position detector means 51 positioned just behind the card port 60. A motor 42 is activated upon the receipt of appropriate signals. Revolution of the motor 42 is transmitted to a card transporting roller or capstan 44 having the elastic property through gearing to transport the card 10 along a guide frame 62. An adjustment roller 46 serves to ensure that the depressing pressure exerted on the card 10 is maintained.

At the instance where the card 10 passes over a reading position associated with the optical reading head 19, the detecting of the positions and characteristics of the individual characters is taking place. As the card 10 is further advanced away from the first pair of light-emitting and light-receiving elements, signals are generated for reversing the revolution of the motor 42 with the results that the card 10 is conveyed backward and returned to its initial position. At this time, the information carried by the card 10 is again viewed and determined. Only when there is an equivalence in the first and second results of the character recognition obtained in the forward and backward movements of the card 10, is confirmation done to initiate various operations or manipulations on the confirmed results.

If the card 10 further advances and the end thereof departs from the first couple of the light-emitting and light-receiving elements previously described, stop demands will be initiated for disabling the motor 42. Then the card 10 is in part held at the port 60.

Although the first photocoupler is positioned perpendicular to the movements of the card 10 in the illustrative embodiments, this may be arranged to be responsive to the reflection light from the surface of the card. In order to prevent misinsertion of the card into the apparatus, the card may include a specific mark at a predetermined position, on which a couple of light-emitting and light-receiving elements is placed to sense reflection light from the specific mark. In other words, the first photocoupler serves also as a card misinsertion avoidance means.

The mode of initiating, terminating and reversing the movements of the card 10 will be described below with reference to FIGS. 10 and 11.

Figure 10:
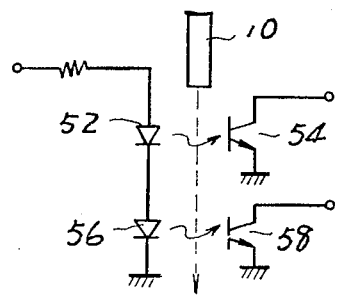
FIG. 10 is a circuit diagram of a card position detector arrangement.

A card position detector arrangement used in the embodiment of the present invention is illustrated in FIG. 10, which comprises two pairs of light-emitting and light-receiving elements. Semiconductor light-emitting elements such as GaAs light-emitting diodes and the like are employed as the light-emitters 52, 56 while Si planar type photo-transistors and the like are employed as the light-receiving elements 54, 58. FIG. 11 shows output waveforms of the light-receiving elements 54, 58 when the card 10 is transported.

At the point in time $T_1$ where the card 10 is inserted into the apparatus, a light transmission path between the light emitting and light-receiving elements is shuttered so that the outputs of the light-receiving element 54 become zero.

Figure 11:
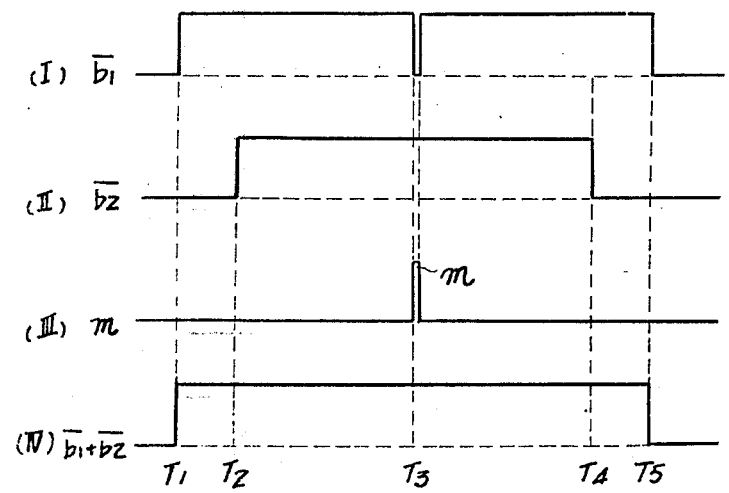
FIG. 11 is a waveform chart showing outputs from light-sensitive elements within the arrangement of FIG. 10.

The inversion $\overline{b_1}$ of the outputs from the light-receiving element 54 is illustrated by FIG. 11 (I). The card 10 passes past the first photocoupler 52, 54 at a time $T_1$ and the signal $\overline{b_1}$ is held at a high level, which enables the motor 42.

As viewed from FIG. 11(II), the card 10 arrives at and shutters optically the second pair of light-emitting and light-receiving elements 56, 58 at a time T2. Therefore, the outputs from the light-receiving element 58 become zero and the inverted signals $b2$ are at a high level. The motor 42 continues to rotate during the period wherein either the inverted signals $\overline{b_1}$ or the inverted signals $\overline{b2}$ or both are at a high level (FIG. 11(IV)).

Thereafter, at the time T3 the card 10 passes past the first photocoupler 52, 54 causing the signals $\overline{b_1}$ to decline to a low level at once so that the motor 42 is provided with the inversion signals m (FIG. 11(III)). As a consequence, the card 10 is transported backwards and thus passes past the second photocoupler 56, 58 at time T4 and passes past the first photocoupler 52, 54 at time T5. Then the motor 42 is disabled. It will be noted that the motor 42 is activated for a period of time where a logical sum signal of both the signals $\overline{b_1}$ and $\overline{b2}$, viz, $\overline{b_1} + \overline{b2}$ is at a high level, for example, the time period from $T_1$ to T5 in the illustrative embodiment.

By activating the motor and transporting the card in this way, the card inserted into the apparatus is positively returned back to its inserted position. These operations are in no way mechanical means for activating, stopping and inverting the motor. In additon, the card is carried in a reciprocating fashion and information contained thereon is sensed twice, the first time in the forward movement of the card and second time in the backward movement of the card thereby improving the reliability of information detection. Thus, the longer time required for making information detection is avoided.

The invention being thus described, it will be obvious that the same may be varied in many ways. Such variations are not to be regarded as a departure from the spirit and scope of the invention and all such modifications are intended to be included within the scope of the following claims.

What is claimed is:

1. An embossed card reader comprising a table for providing support for an embossed card to be read, means for transporting the embossed card along the table, a slit plate disposed over said table, said slit plate being provided with an incident light slit and a reflection light slit, a source of light for irradiating the surface of the embossed card through the incident light slit of the slit plate to produce a parallel light beam, and light-responsive means for detecting light reflected from the surface of the embossed card and passed through the reflection light slit of the slit plate, said parallel light beam enabling the simple and accurate reading of information contained on the embossed card.

2. The embossed card reader as defined in claim 1, wherein the slit plate is disposed in such a manner relative to the embossed card so that the light reflected on the raised or planar surface of the embossed card is allowed to pass through the reflection light slit of the slit plate.

3. The embossed card reader as defined in claim 1 wherein each slit formed in the slit plate is positioned at a given angle to the direction in which the card is being transported and the light-responsive means comprises a plurality of parallel aligned light-receiving elements which are secured at a position to accept light-reflected from the surface of the embossed card and gated through the reflection light slit of the slit plate.

4. The embossed card reader as defined in claim 3 wherein as the plurality of the light-receiving elements are sequentially scanned, the reading of information therefrom is carried out in a storage mode.

5. The embossed card reader as defined in claim 1, wherein a first lens is disposed between said light source and said slit plate to convert the light emanating from the light source into a light beam and a second lens is disposed between said light responsive means and said slit plate to collect the reflected light on the light responsive means.

6. An optical reading head for reading information contained in a record medium comprising a slit plate having an incident light slit and a reflective light slit, a source of light for irradiating the record medium through the incident light slit to produce a parallel light beam and read-out cells for responding to light reflected on the record medium and passed through the reflective light slit, said parallel light beam enabling the simple and accurate reading of information on the record medium.

7. The optical reading head as defined in claim 6 wherein the read-out cells comprise a plurality of light-receiving elements aligned in an array.

8. An optical reading head as defined in claim 7 wherein each slit plate formed in the slit is positioned parallel to the array of the multiple read-out cells.

9. An embossed card reader comprising a table for supporting an embossed card, a driving mechanism for transporting the embossed card in a reciprocating fashion along the table, a slit plate disposed over said table, said slit plate being provided with an incident light slit and a reflection light slit, a source of light for irradiating the embossed card on the table through the incident light slit formed in the slit plate to produce a parallel light beam, light-responsive means for sensing light reflected from the surface of the embossed card and passed through the reflection light slit and a card position detector mechanism for detecting the position of the embossed card on the table and controlling the driving mechanism accordingly.

10. An embossed card reader as defined in claim 9 wherein the card position detector mechanism comprises two photocouplers each having light-emitting and light-receiving elements.

11. A method for reading information contained on an embossed card comprising steps of positioning a slit plate having an incident light slit and a reflection light slit parallel to the embossed card, irradiating the surface of the embossed card through the incident light slit to produce a parallel light beam, detecting light reflected from the surface of the embossed card and passed through the reflection light slit, and reading the information contained on the embossed card in accordance with the intensity of the reflected parallel light beam.

12. A method as defined in claim 11 wherein the embossed card is conveyed in the forward and reverse direction so that the information on the embossed card is obtained both during the forward and reverse movements of the card.

* * * * *